L. LYNCH.
RIM.
APPLICATION FILED DEC. 28, 1920.

1,401,264.

Patented Dec. 27, 1921.
2 SHEETS—SHEET 1.

Inventor
Lawrence Lynch,
By
Attorney

L. LYNCH.
RIM.
APPLICATION FILED DEC. 28, 1920.

1,401,264.

Patented Dec. 27, 1921.
2 SHEETS—SHEET 2.

Inventor
Lawrence Lynch,
By C. H. Parker
Attorney

UNITED STATES PATENT OFFICE.

LAWRENCE LYNCH, OF LOS ANGELES, CALIFORNIA.

RIM.

1,401,264.  Specification of Letters Patent.  Patented Dec. 27, 1921.

Application filed December 28, 1920. Serial No. 433,580.

*To all whom it may concern:*

Be it known that I, LAWRENCE LYNCH, a citizen of the United States, residing at Los Angeles, in the county of Los Angeles and State of California, have invented certain new and useful Improvements in Rims, of which the following is a specification.

This invention relates to rims for pneumatic tires, and it comprises a rim formed in two sections, one of which is secured to the felly of the wheel and the other removable, said stationary section being provided with bayonet slots on its inner edge, the removable section being provided with lugs on its inner edge, adapted to be received in said slots, removable handles arranged on said removable section, and locking means carried by the felly of the wheel and engaging said removable section.

In the present invention, I have provided a separable rim in which the use of nuts and bolts passing through the felly of the wheel is eliminated. The removable section of the rim may be quickly and readily put on and taken off, and may be locked when in position, to prevent theft of the tire.

The handles by means of which the removable section of the rim is turned when taking it off of the wheel, are mounted in threaded sockets in the removable section, whereby they may be removed after the removable section has been placed on the tire, and placed in the tool box of the machine, or kept in any other desired place.

In the accompanying drawings, I have shown one embodiment of the invention. In this showing:

Figure 1:
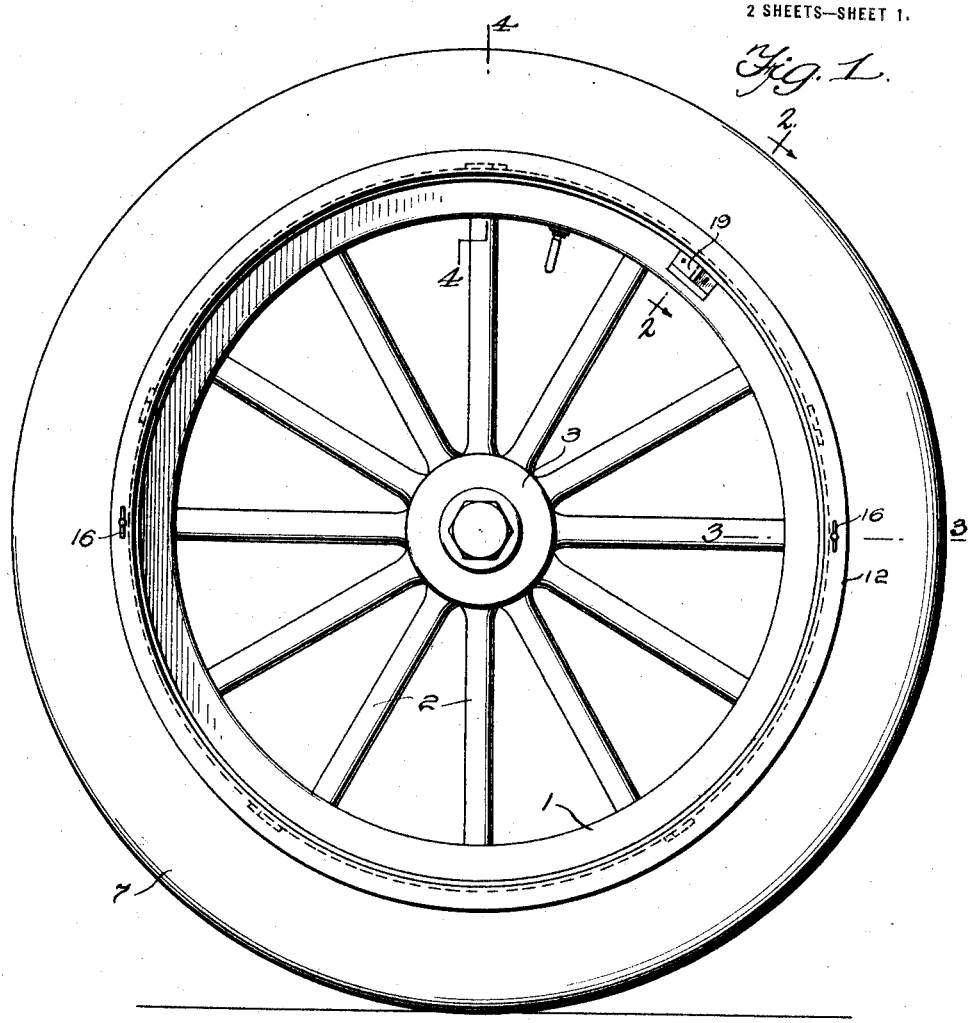
Figure 1 is a side elevation of a vehicle wheel showing the rim in position.
Figure 2:
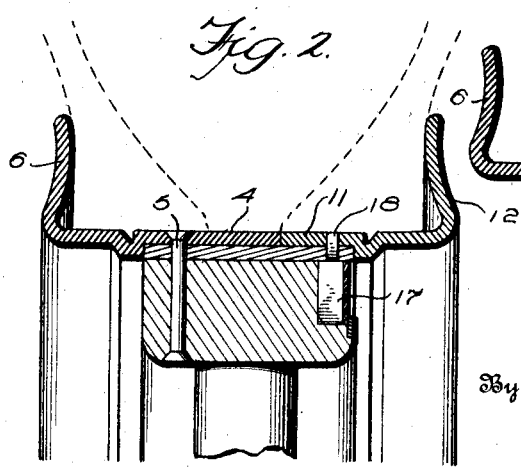
Fig. 2 is a transverse sectional view on line 2—2 of Fig. 1.
Figure 3:
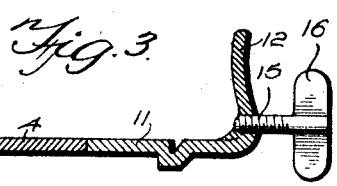
Fig. 3 is a similar view on line 3—3 of Fig. 1.

Referring to the drawings, the reference numeral 1 designates the felly of a vehicle wheel having the usual spokes 2 and hub 3. The rim is formed in two sections, the section 4 of the rim, which is the stationary section, is secured to the felly by means of bolts 5 or other suitable fastening means. This section is provided with a flange 6 for the reception of the bead of tire 7, in the usual manner.

Figure 4:
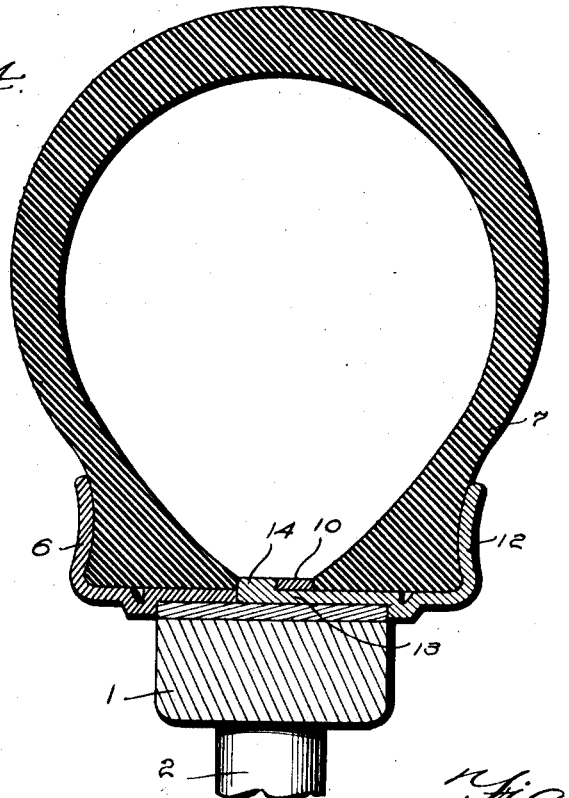
Fig. 4 is a similar view on line 4—4 of Fig. 1.
Figure 5:
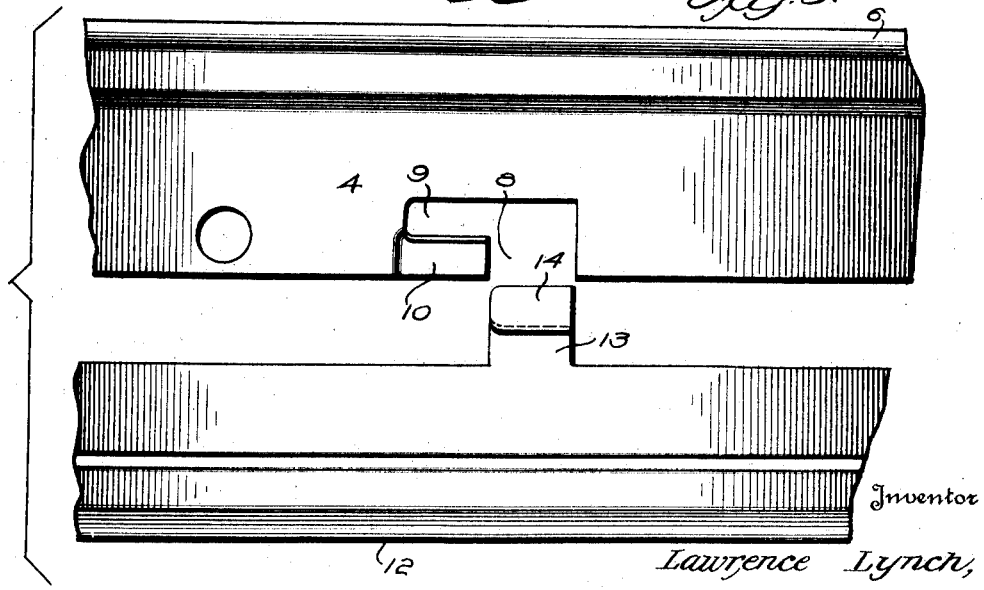
Fig. 5 is a plan view of a portion of the rim showing the sections separated.

Referring to Fig. 5 of the drawings, the inner edge of the fixed section of the rim is provided with slots 8, extending transversely of the rim and communicating with longitudinal slots 9, forming substantially L-shaped or bayonet slots. The sections of the rim between the longitudinal slots 9 and the edge are off-set as at 10 (see Fig. 4).

The removable section 11 of the rim is provided with the usual flange 12. This section is also provided with laterally extending portions 13, arranged on its inner edge, carrying lugs 14, which are of greater thickness than the body portion of the rim section (see Fig. 4). When the rim is assembled, the lugs 14 are first inserted in the slots 8, and the removable section is then moved to the left, in Fig. 5 of the drawings, the lugs entering the longitudinal slots 9, and the portions 13 being received beneath the offset portions 10 of the stationary section.

A plurality of threaded openings are provided on the outer side of the removable section, and these openings are adapted to receive threaded stems 15, having suitable handles 16, arranged thereon, whereby the removable section of the rim may be easily manipulated. Means are provided for locking the removable section in position, to prevent its unauthorized removal and the theft of a tire. As shown, a lock 17 is arranged on one edge of the felly and this lock is provided with a bolt 18, which is adapted to project through an opening in the removable section of the rim. The lock and opening are so arranged that the opening will register with the lock bolt 18 when the removable section of the rim is in position. The face of the lock is covered by a sliding plate 19, whereby the entrance of dust and dirt into the locking mechanism is prevented.

It is believed that the operation of this device will be apparent from the foregoing description. The removable section of the rim is placed in position by first inserting the lugs in the slots to their full depth and then turning the removable section of the rim, whereby the lugs assume a position at the inner end of the longitudinal slots 9. By operating the locking bolt 18, the rim sections may then be retained in position, and it is necessary to retract the bolt of the lock before the removable section may be removed.

The provision of handles 16 which may be removed after the rim is assembled, is advantageous in that it provides means for gripping the rim and thus facilitates the work of the operator.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

A separable rim comprising a rim section secured to the felly of a wheel, said section being provided with bayonet slots on its inner edge, the portion of the rim between the slots and the inner edge being raised above the surface of the body portion, a removable section having a plurality of lugs arranged on its inner edge and adapted to enter said slots, said lugs being of greater thickness than the thickness of the rim and extending above the surface of the rim substantially flush with said raised portion, and means for locking said removable section to prevent relative movement with respect to the fixed section.

In testimony whereof I affix my signature in presence of two witnesses.

LAWRENCE LYNCH.

Witnesses:
CARL JOHNSON,
FRANK ANDERSON.